United States Patent [19]

Maistre

[11] 4,168,337

[45] Sep. 18, 1979

[54] THREE DIMENSIONAL STRUCTURE FOR REINFORCEMENT

[75] Inventor: Michel A. J. Maistre, Bordeaux-Cauderan, France

[73] Assignee: Societe Europeenne de Propulsion, Puteaux, France

[21] Appl. No.: 896,582

[22] Filed: Apr. 14, 1978

Related U.S. Application Data

[63] Continuation of Ser. No. 592,722, Jul. 3, 1975, abandoned.

[30] Foreign Application Priority Data

Jul. 5, 1974 [FR] France ................................ 74 24243

[51] Int. Cl.$^2$ .............................................. B32B 5/12
[52] U.S. Cl. ..................................... 428/113; 52/648; 428/107; 428/367; 428/368; 428/397; 428/902; 428/105; 428/112; 428/364

[58] Field of Search ............... 428/113, 114, 357, 361, 428/367-368, 364, 375, 902, 105, 107; 244/117 R; 52/309.7, 309.16, 648, 650

[56] References Cited

U.S. PATENT DOCUMENTS

| | | | |
|---|---|---|---|
| 3,169,611 | 2/1965 | Snelson | 52/648 |
| 3,949,126 | 4/1976 | Crawford | 428/113 |

*Primary Examiner*—George F. Lesmes
*Assistant Examiner*—Alexander S. Thomas

[57] ABSTRACT

The reinforcement for a reinforced three dimensional structure comprises four bundles of rectilinear elements with the elements of each bundle arranged in the form of spaced parallel sheets with the sheets of two of the bundles parallel to one another and alternately disposed, the sheets of the other two bundles being similarly arranged but inclined to the sheets of the first mentioned bundles.

11 Claims, 5 Drawing Figures

THREE DIMENSIONAL STRUCTURE FOR REINFORCEMENT

This is a Continuation, of application Ser. No. 592,722, Filed July 3, 1975, now abandoned.

The present invention has the objection of providing a new composite structure with three dimensional reinforcement.

In engines, the zones of which thermally the highest demands are made, such as nozzles or jet pipes in the neighbourhood of the throat and the part just before the convergent tail cone, necessitate recourse to the use of high refractory materials capable of resisting thermally originated mechanical stresses of the highest order.

Quite naturally carbon has been chosen as the base material by virtue of its very high temperature of sublimation and of its low density. However, its mechanical and physical properties, in particular the coefficients of expansion and of thermal conductivity vary considerably according to the form in which it is present. This has led users to conceive a reinforced structure of which the reinforcement comprises carbon having high mechanical characteristics with the principal objective of providing a reinforcement which avoids zones of reduced resistance where there would be a risk of rupture.

Reinforced structures obtained by stratification of unidirectional sheets or of tissues presenting a need for cohesion between the sheets to entrain the sheets against delamination, has led to the proposal to provide a structure comprising a reinforcement consisting of an inter-section of three orthogonal bundles of rectilinear filaments.

Nevertheless, this structure presents numerous disadvantages. In fact, the voids or cells formed in the reinforcement by the inter-section of the three bundles are parallelipipedonal volumes which have a dimension equivalent to the size of the filament used, are practically isolated one from another and present obturations. The volume occupied by these voids being comprised between 25% and 40% of the total volume of the reinforcement depending on the section of filament used, leads to the provision of a reinforcement which is not very compact.

These disadvantages are evident at the moment of coating of the reinforcement if coating is achieved either by impregnation of a liquid resin following polymerisation and pyrolysis or by progressive infiltration, for example by internal depositing of pyrolytic carbon obtained by the decomposition of a hydrocarbon gas. In the case of this impregnation, pyrolysis is generally accompanied by a volume reduction of more than 50% of the resin which, in a dimensionally stable reinforcement, results in fissures in the coating and/or a lack of cohesion between the coating and the fibres. Thus, in the prior art reinforcements, the defects resulting from on the one hand the volume occupied by the voids and, on the other hand, their isolation one from another are accentuated.

Coating provided by gaseous infiltration does not result in a high quality composite since the gaseous infiltration has the effect of provoking premature closure of the larger voids leaving only access passages of small cross-section.

The present invention has for its object the reduction of the above disadvantages and the proposal of a new composite presenting higher mechanical characteristics and capable of being used in diverse fields.

According to one aspect of the present invention we provide a reinforced three dimensional structure in which the reinforcement comprises an inter-section of four bundles constituted by sheets of rectilinear elements of polygonal or circular cross-section, the arrangement being such that the sheets of two of the bundles are alternately disposed in adjacent parallel planes and the sheets of the other two bundles are similarly situated but in further parallel planes inclined with respect to the first mentioned parallel planes, the elements of each sheet being inclined with respect to the elements of the contiguous parallel sheet of a different bundle.

There is thus provided a reinforcement whose elements occupy three-quarters of the disposable volume, thereby leading to a very compact composite structure whose compactness is practically unmodified by the nature of the elements which can be of polygonal or circular cross-section.

Further, there is thus provided a reinforcement in which the voids or cells communicate with one another to a considerable extent, this permitting simple coating by traditional processes.

Preferably the bundles are orientated according to the four heights of a regular tetrahedron, the elements of the two consecutive sheets belonging to a single bundle being of hexagonal section and disposed quincunxially in order to obtain a perfectly isotropic and compact reinforcement with the volumes of the voids clearly smaller than those of said elements, which permits the cutting of the reinforcement into pieces of complex form presenting uniform properties.

According to another aspect of the present invention we provide a process of forming a structure of the above type, comprising: providing a reinforcement by stacking a set of alternate sheets of parallel elements of polygonal or circular cross-section with a set of intervening sheets of differently inclined but mutually parallel elements, the elements of the sheets of each set being disposed quincunxially; inserting in the meshes of said stack two further bundles of elements disposed in alternate and intervening sets of sheets, the directions of said further bundles being different and inclined with respect to the sheets of said stack; then coating said reinforcement.

In order that the present invention may more readily be understood, the following description is given, merely by way of example, of one preferred embodiment of the invention.

Reference will be made to the accompanying drawings, in which.

Figure 1:
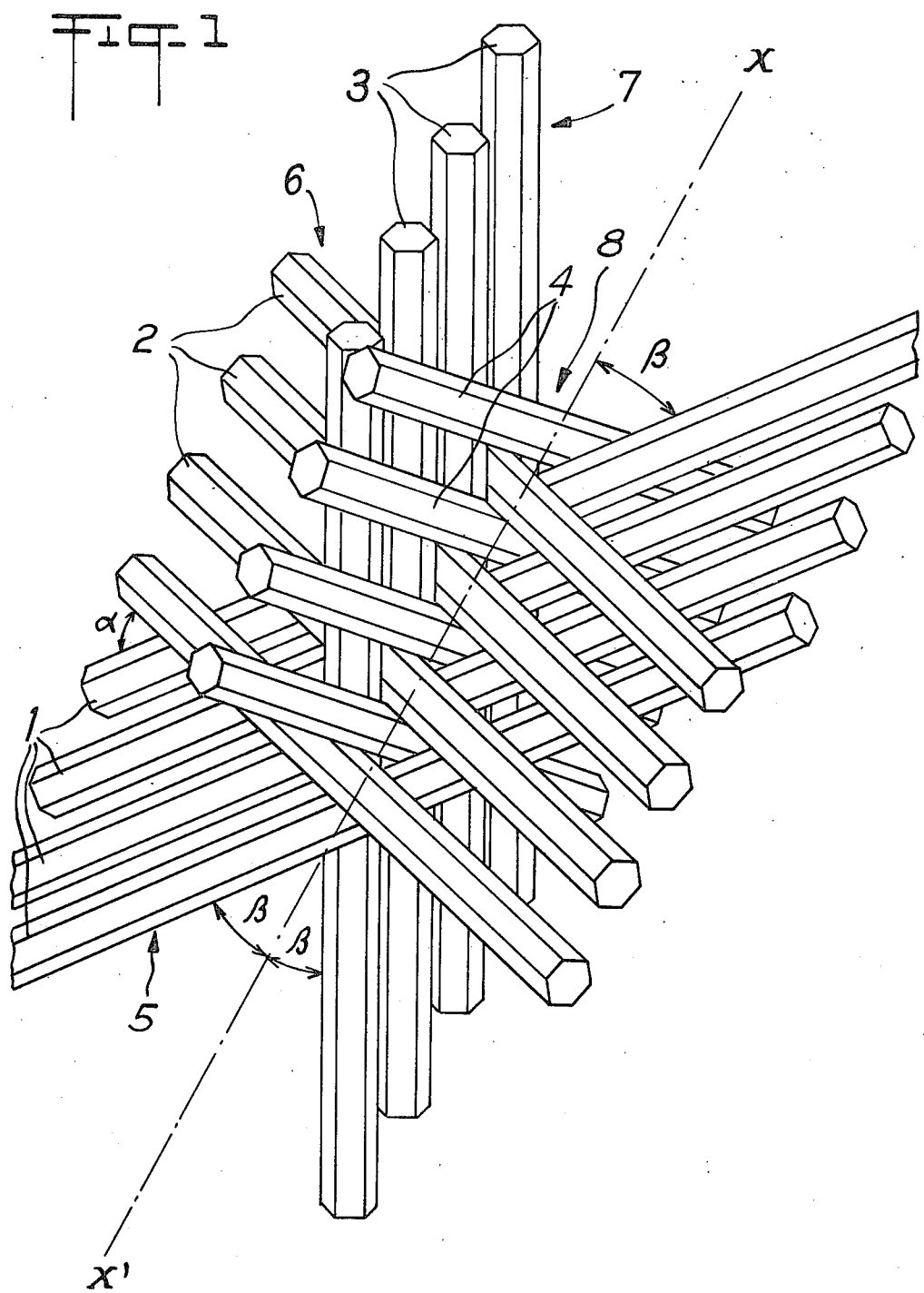
FIG. 1 is a partial perspective view of one embodiment of a reinforcement according to the invention.
Figure 2:
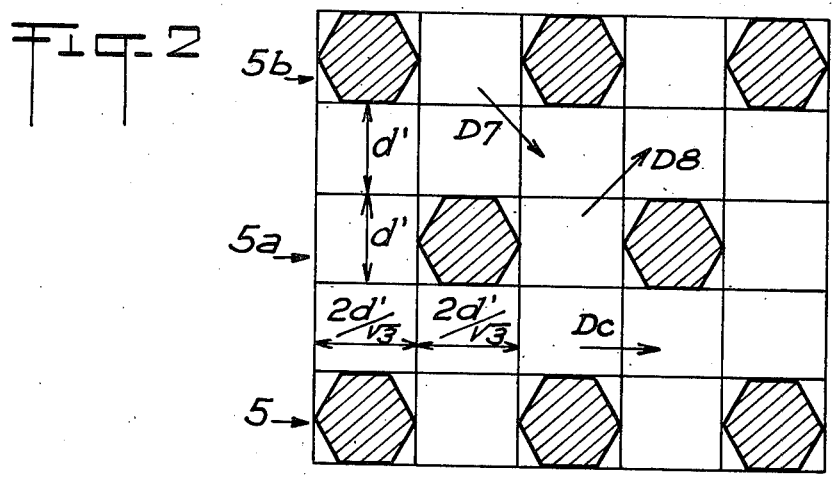
FIg. 2 is a transverse section of a bundle of the reinforcement of FIG. 1.

The composite according to the invention comprises a reinforcement shown in FIGS. 1 to 3 as being constituted by the inter-section of four bundles of elements 1 to 4 which are disposed as sheets 5 to 8 (FIG. 1). The sheet 5 is, for example, situated in a horizontal plane whilst the sheet 6 which is adjacent to it is equally in a horizontal plane but is angularly displaced with respect to the sheet 5, that is to say that the elements 1 and 2 of the two horizontal sheets 5 and 6, respectively, form a given angle α between them variable as a function of the ultimate use of the composite in which the reinforcement is embedded.

Two other bundles formed by the sheets 7 and 8 are woven through the meshes formed by the elements 1 and 2.

These other bundles each define a plane which can be inclined with respect to the horizontal plane of sheets 1 and 2 and can, in the limit, be a vertical plane, it being understood that the sheets 7 and 8 make a given angle between them and that they present the same inclination with respect to the first two bundles.

In the embodiment shown in FIG. 1, the four bundles are directed along the four heights of a regular tetrahedron, this implying that the sheets 5 and 6 make between them an angle α such that $\cos \alpha = \frac{1}{3}$, that is to say 70°30′. Equally, the elements of sheets 7 and 8 include an angle α such that $\cos \alpha = \frac{1}{3}$. By virtue of this, and of the chosen example of a tetrahedron, each sheet 5 and 8 includes an angle β of 54°45′ with the axis of symmetry XX′.

Each sheet 5 to 8 is constituted by identical rigid elements of polygonal or cylindrical cross-section whose axes are spaced from one another when considering a single sheet (say sheet 5) by a distance equal to $4d'\sqrt{3}$ if d′ is the diameter of the largest circle, completely enclosed by the section of said elements. This spacing is of course $2d$ where d is the diameter of the smallest circle which completely encloses the section of each element. In the case of a hexagonal section element, $d = 2d'\sqrt{3}$.

In the examples shown in FIGS. 1 to 3, and more particularly in FIG. 2, it can be seen that the elements are of hexagonal section and belong to three parallel sheets 5 to 5b which belong to one single horizontal bundle and are separated from one another by a distance equal to the diameter d of the largest circle which is totally enclosed by the section of the element. Further, the elements 1 and 1a of the two consecutive sheets 5 and 5a belonging to a single bundle are disposed quincunxially as is shown for these elements.

It should be noted that FIG. 2 illustrates the positioning of three other bundles of the reinforcement since between the sheets 5, 5a and 5b and in the direction $D_6$ there is the bundle constituted by the parallel sheets 6 comprising rigid elements 2, whilst along the directions $D_7$ and $D_8$ there are the bundles constituted respectively by the parallel sheets 7 and the parallel sheets 8.

Figure 3A:
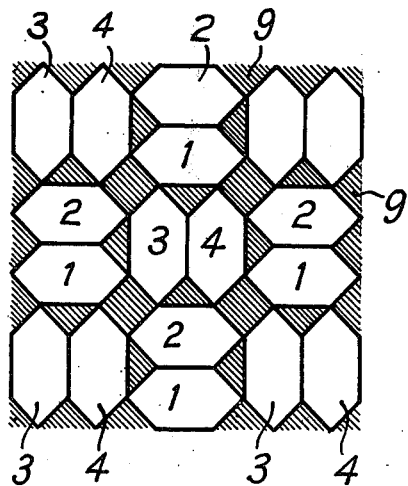
FIGS. 3a and 3b are transverse sections of the reinforcement of FIGS. 1 and 2.
Figure 3B:
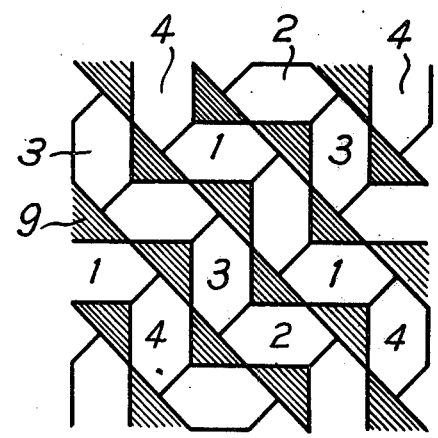

FIGS. 3a and 3b show two successive sections along planes perpendicular to the axis of symmetry XX′ of the reinforcement according to the invention, where the cross hatched parts represent the pores 9 between the elements. From FIG. 3a, it can be seen that elements 3 and 4 of sheets 7 and 8 are situated on both sides of the elements 1 and 2 of sheets 5 and 6, whilst immediately therebelow are the elements 3 and 4 disposed between the elements 1 and 2 before the next level immediately therebelow where again elements 1 and 2 are found between the elements 3 and 4.

In FIG. 3b, which is a section perpendicular to the two planes formed one by the sheets 5 and 6 and the other by the sheets 7 and 8, there can be seen the dispositions of elements 1 to 4 and the disposition of the pores 9 with respect to said elements.

The process of providing the reinforced composite described above may for example consist of stacking the alternate and adjacent sheets of elements 1 and 2 including a given angle between them and such that the parallel sheets belonging to any one bundle present quincunxially disposed elements.

In to the meshes defined by the stacking of sheets 1 and 2, there can be inserted the elements of two other bundles of elements analagous to those of sheets 7 and 8 in order to complete the reinforcement described in the application of FIGS. 1 to 3.

Figure 4:
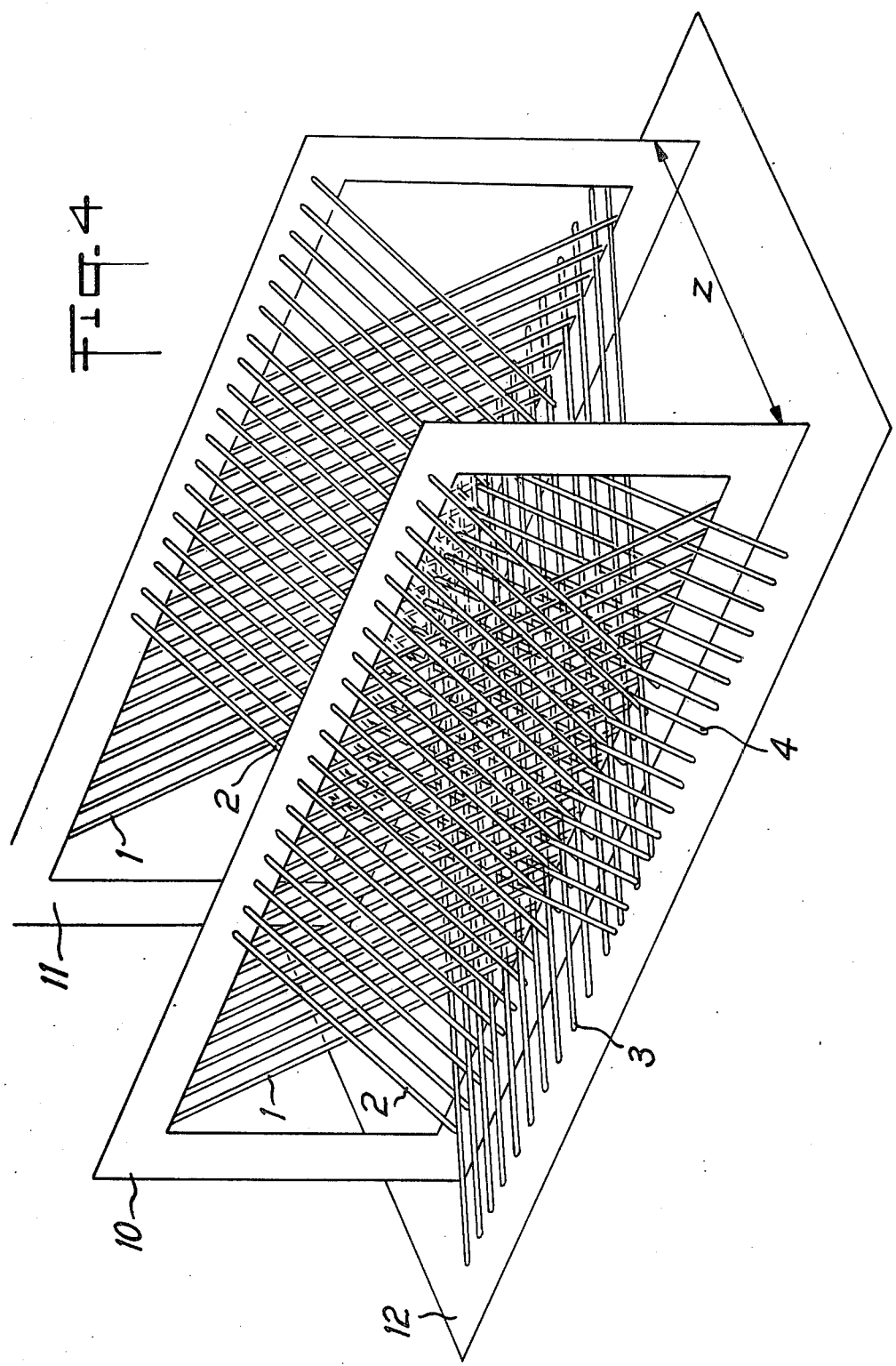
FIG. 4 illustrates one form of the process for making the reinforcement.

According to another process of manufacture (FIG. 4) initially two lattices 10 and 11 can be built, each of these lattices being constituted by two plane networks superposed to make between them an angle of 70°5′. These two networks can, for example, be those constituted by elements 1 and 2 of FIG. 1. The lattices 10 and 11 are disposed vertically with respect to a horizontal plane 12 and are spaced apart by a distance Z which is a multiple of the diameter of the circle inscribed in the section of the elements. A third network of elements is introduced across the two lattices in a plane perpendicular to the lattices and such that the elements, for example analogous to elements 3, of the third network form angles of 70°5′ with the elements 1 and 2 of said lattices, the distance between the axes of those elements belonging to the same network being $4d\sqrt{3}$ if d is the diameter of the circle inscribed in the section of said elements.

A fourth network of elements analogous to elements 4 is finally introduced across the two lattices according to the same rules as above. Further, this fourth network can be adjacent to the third network and such that the elements make angles of 70°30′ with those of said third network.

When all the networks analogous to the third and fourth networks have been placed in position, that is to say when the lattices are saturated, more elements 1 and 2 parallel to those constituting said lattices can then be inserted into the remaining interstices.

When all the interstices have thus been filled, the reinforcement is finished and can be coated according to one of the ways described below.

The elements making up the bundles can be rigid with a section which is polygonal such as hexagonal or circular, or they may be flexible. Equally rigid elements may be used in association with flexible elements, the choice of the material of said elements and their number being a function of the eventual use of the composite.

In the same way, and preferably during coating of the reinforcement, each element can be coated with an appropriate resin or with carbon deposit compatible with the final coating which will finish the composite and will confer the functional characteristics to the latter.

The final coating can be achieved in different ways and in a satisfactory manner by virtue of the communication of the voids 9 appearing in the reinforcement.

This coating can be obtained by liquid flow, that is to say by liquid impregnation which consists of (a) eliminating the gas occupying the voids and then (b) injecting under pressure a resin which is in a first polymerised phase and then in a second pyrolised phase. When the pyrolysis accompanies a volume reduction of the resin of the order of 50%, the impregnation process will be repeated until all the voids have been filled.

Another way of coating, known per se, can equally be used. This consists, for rapidly achieving a high density of carbon when the coating is of a carbon base, of providing progressive infiltration for example by deposit of pyrolytic carbon obtained by decomposition of a hydrocarbon gas so that the carbon deposition produces successively uniform coverage of all the accessible surfaces.

In another coating process, it is preferable to fill progressively the voids of the reinforcement by successive deposits of thin coke layers obtained in three sequential operations; firstly an impregnation to wet the reinforcement with a resin of low velocity such as a phenolic resin or even better a furanyl resin, then evaporating to leave only a thin film of resin on the walls of the voids and to avoid their premature filling, and finally drying, polymerisation and pyrolysis, the cycle of deposit of thin layers being started after pyrolysis, until the voids are saturated. Given the low thickness of the resin disposed in each cycle, the thermal treatments can be very rapid.

If follows that the process of manufacture of the reinforced composite structure according to the invention is not limited to the method described above, but embraces, on the contrary, all variants falling within the scope of the claims attached.

Notably one could subject the reinforcement to a preliminary coating treatment according to one of the three ways set out above. For example, if coating of the reinforcement is obtained by means of a thermosetting resin deliberately maintained in a state of pre-polymerisation, heating to the softening temperature of the resin permits adhesion of the elements to one another at all their points of contact, this augmenting the cohesion of the composite structure. This softening can be used to advantage for providing a preform, centering of plates for example, or for compacting the reinforcement to provoke simultaneously an increase of the density and an improvement of imbrication of the elements to one another. As their initially rectilinear configuration becomes undulated the elements are more solidly maintained in place.

We claim:

1. A four-directional reinforcement structure for a composite material consisting of a first, a second, a third and a fourth bundle each consisting of a plurality of elongated rectilinear parallely spaced elements extending parallel to a respective direction and arranged into a plurality of rows, the elements of each bundle extending diagonally to the elements of at least two of the other bundles, each row having a plurality of said elements in parallel, spaced planar relation, said first and second bundles having a plurality of rows, said rows of said first and said second bundles being respectively disposed in alternate parallel planes, said third and said fourth bundles also having a plurality of rows, said rows of said third and fourth bundles also being respectively disposed in alternate parallel planes, the parallel planes of said first and second bundles being at an angle to the parallel planes of said third and fourth bundles, the elements of said third and fourth bundles passing through spaces provided between the elements of said first and second bundles.

2. A structure as claimed in claim 1, wherein the rows in each bundle are arranged in a staggered relationship.

3. A structure as claimed in claim 1, wherein all elements of the structure are inclined at a same angle with respect to an axis of symmetry of the structure.

4. A structure as claimed in claim 1, wherein the elements of the four bundles are respectively parallel to the four heights of a regular tetrahedron.

5. A structure as claimed in claim 1, wherein the axes of the elements in each row are spaced from one another by a distance equal to twice the diameter of the smallest circle enclosing the cross-section of one of said elements.

6. A structure as claimed in claim 1, wherein the rows of each bundle are disposed in planes separated from each other by a distance equal to an integral multiple of the diameter of the largest circle enclosed by the cross-section of one of said elements.

7. A structure as claimed in claim 1, wherein said elements have identical cross-sections.

8. A structure as claimed in claim 1, wherein said elements have a hexagonal cross-section.

9. A structure as claimed in claim 1, wherein at least a part of said elements are rigid.

10. A structure as claimed in claim 1, wherein at least a part of said elements are flexible.

11. A structure as set forth in claim 1, wherein the elements are carbon fibres.

* * * * *